ELECTRICAL APPARATUS

Filed Jan. 2, 1957 2 Sheets-Sheet 1

INVENTOR:
Robert D. Kodis,
BY Bair, Freeman & Molinare
ATTORNEYS.

Oct. 18, 1960 R. D. KODIS 2,957,163

ELECTRICAL APPARATUS

Filed Jan. 2, 1957 2 Sheets-Sheet 2

INVENTOR:
Robert D. Kodis,
BY Bair, Freeman & Molinare
ATTORNEYS.

United States Patent Office 2,957,163

Patented Oct. 18, 1960

2,957,163

ELECTRICAL APPARATUS

Robert D. Kodis, Newton, Mass., assignor, by mesne assignments, to Minneapolis-Honeywell Regulator Company, a corporation of Delaware Filed Jan. 2, 1957, Ser. No. 632,165

9 Claims. (Cl. 340—172.5)

This invention relates generally to improvements in information transfer apparatus and more particularly to improvements in information transfer apparatus of the type adapted to serve as a buffer between data processing devices having different speeds of operation.

In data processing systems, such as computers, telegraph systems, telephone systems and the like, information is stored, transferred and acted upon in the form of electrical pulses. In many such systems, the data is processed in the binary form of notation, i.e., in time spaced bits or pulse positions in which there is an electrical pulse for each bit representing a "one" and no electrical pulse for each bit representing a "zero." Commonly, these information bits represent numeric characters or alphabetic characters or mixtures of such characters which are handled in groups by the data processing machines in the system. Each of these groups of characters occupies the same amount of space in time within the machine, that is the same number of pulse positions, and therefore such groups commonly are called machine words. Thus, each machine word consists of a given number of time spaced bits.

A basic problem arises in many of the above described systems from the fact that information is supplied to or received from a data processing machine at a comparatively slow speed while the processing of the data itself by the machine takes place at a comparatively high speed. Thus, the information fed into or received from the data processor generally stored on punched cards, punched tapes, magnetic drums or magnetic tapes, and the speed of the information transfer operation is affected by the mechanical limitations inherent in the use of such record mediums. The data processing machines utilized in present day systems are capable of operation at electronic speeds and it will be appreciated that the efficiency of such a system is seriously affected by the difference in operation speeds between the units of the system. By way of illustration, in some prior art systems it often is necessary for some parts of the system to be overworked while other parts are forced to remain idle.

Accordingly, it is a general object of this invention to provide improved information transfer apparatus adapted to match the operations of a high speed data processor and a lower speed record medium handling device.

It is another object of this invention to provide improved information transfer apparatus characterized by its ability to receive information data at one speed and to transmit information data at a different speed.

It is still another object of this invention to provide improved information transfer apparatus adapted to receive information data in the form of multi-bit words in either a serial or parallel manner and to transmit the stored words in either a serial or parallel manner.

It is a further object of this invention to provide a multiple level buffer register between different units of a data processing system which is characterized by the relative simplicity of the circuitry required, both in the buffer register and its associated control equipment.

It is a still further object of this invention to provide a multiple level buffer register between a data processor and a record medium handling device in which one or more words may be transferred to the buffer register from the data processor and stored until a first level is filled, and in which the block of information stored in the first level may be transferred en masse to the second buffer level for read out to the record medium.

It is a still further object of this invention to provide in an information processing system an improved information transfer buffer register which is characterized by its efficiency, its flexibility and its economy of construction.

These and other objects are attained in a specific illustrative embodiment of the invention in which a plurality of buffer levels are provided, each comprising a bank of shift registers. In accordance with one embodiment of the invention the shift registers advantageously are of the type which utilize magnetic cores having two stable states of magnetization. In such magnetic cores current pulses are used to set the magnetization of the core in either of its two stable states to thereby represent a binary "one" or a binary "zero." The cores in each shift register are arranged such that the application of a shift pulse to a magnetic core, by means of a shift winding, shifts the magnetization of the core, if a signal is stored therein, from one stable state to another, to produce a pulse in an output winding.

A feature of the invention is the provision of an input shift register in the input level of the buffer into which an information word may be read in parallel, that is, all of the information bits comprising the word are dropped simultaneously into the corresponding cores of the shift register, or in serial, i.e., bit by bit into a selected core of the input shift register. Each time a group of information bits is received from the information processor, the bits stored in the buffer register are all shifted to succeeding shift registers and the new bits are written into the input shift register. This process continues until the entire bank of shift registers in the input level of the buffer register is loaded with information words received from the information processor.

In accordance with another feature of the invention, all of the information bits stored in the input level of the buffer then are transferred to the shift registers in the output level of the buffer by the application of a single control pulse on a transfer line. The output level of the buffer registers comprises a bank of magnetic core shift registers in which there is at least one magnetic core connected to each magnetic core of the input level registers. It is a further feature that the transfer link between each pair of corresponding magnetic cores includes a unidirectional impedance, for example a diode, such that the input and output levels of the buffer register may be operated independently. However, it is a feature of this invention that the transfer to the output level of all of the information stored in the input level is attained by the application of a single control pulse on the transfer line.

The transfer serves to clear the input level of the buffer register so that new information may be written therein from the data processor. At the same time, the information transferred to the output level may be read out of the magnetic cores, in either parallel or serial fashion, into a suitable record medium. Thus, it will be appreciated that the invention serves to substantially reduce transfer delays due to the differences in the speeds of operation of the electronic data processor and the record medium handling device since information may simultaneously be read out of the data processor at one rate and written into the record medium at a different rate.

In accordance with further embodiments of the invention, one or more intermediate buffer levels are provided between the input and output levels. Thus, a transfer shift winding and coupling diodes are provided between the magnetic core pairs of succeeding levels to provide a greater degree of flexibility in the information transfer process. Further, it is a feature of the invention that selected magnetic core shift registers in each buffer level may be connected to operate in closed loop fashion, if desired, to provide recirculation of data and controllable transfer delay.

The above and other features of novelty which characterize the invention are pointed out with particularity in the claims appended to and forming a part of this specification. For a better understanding of this invention, however, its advantages and specific objects attained by its use, reference is had to the accompanying drawing and descriptive matter in which is shown and described an illustrative embodiment of the invention.

In the drawing:

Figures 1*a* and 1*b* are diagrammatic showings illustrating the operation of the invention as embodied in a two level buffer register;

Figure 1A:
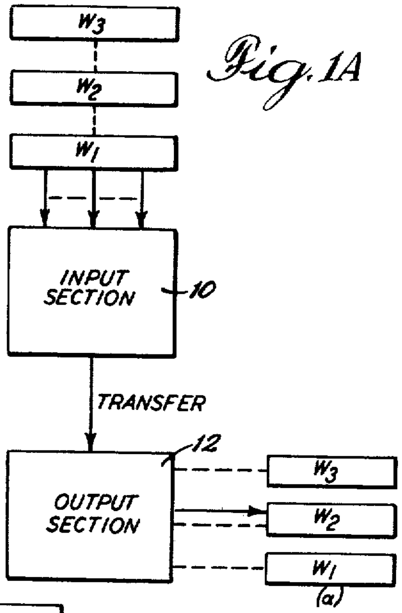
Figure 1B:
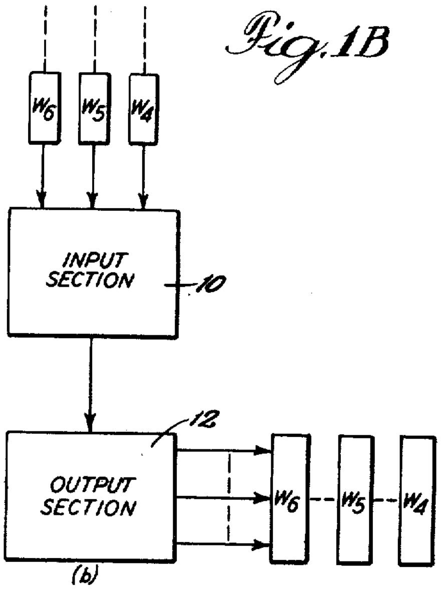

Referring now to Figures 1*a* and 1*b* of the drawing, there is shown in block diagram form a two level buffer register illustrative of the operation of the invention. Each of the buffer registers of Figures 1*a* and 1*b* comprise an input level 10 and an output level 12. As described in greater detail hereafter, each level of the buffer registers comprises a bank of shift registers of the type including a plurality of bistable storage elements. Thus, in an information processing system utilizing a binary notation the stable state of each bistable storage element is indicative of the information stored in the element, namely a binary "one" or a binary "zero."

The circuit of Figure 1*a* is shown receiving a number of multi-bit information words serially, one word at a time being applied to input level 10 of the buffer register. In this mode of operation, the bits of each word all are in parallel. Thus, information word "$W_1$" is written into the input shift register of input level 10 by applying each bit of word "$W_1$" to a positionally corresponding bistable storage element such that all of the bistable storage elements having a pulse applied thereto are set simultaneously. The information stored in the input shift register is shifted, in response to a single shift pulse applied thereto, to a second shift register to set the latter in accordance with the information bits of word "$W_2$." The shift also serves to clear the input shift register to place it in condition for receiving the next information word "$W_2$." This operation is repeated with each information word, there being a shift to a succeeding shift register in the input level of the buffer register each time a new word is written into the input shift register.

When the input level 10 of the buffer is filled, or at any other selected time, a single control pulse is applied to a transfer line coupled to all of the bistable storage elements in the input level of the buffer register. This effects a transfer of all of the information bits stored in the bistable storage elements of input level 10 to corresponding bistable storage elements in output level 12. Output level 12 like input level 10 comprises a plurality of multi-bit shift registers with a number of bistable storage elements in each shift register. After all of the information words in input level 10 have been transferred to the bistable storage elements of the output level 12, the shift registers in the latter are actuated to enable the information words stored therein to be read out in parallel fashion, i.e., the words leave the buffer register in parallel with bits in each word being read out of the output level serially.

In accordance with aspects of this invention input level 10 and output level 12 of the two level buffer register of Figure 1*a* may be operated independently such that information words may be read out of the output level at the same time that new information words are being written into the input level. It will be appreciated that due to the independence of the two buffer levels, the reading and writing operations may be performed at the same time and at different speeds to conform with the inherent rates of operation of the instrumentalities connected to the buffer register. Thus, if the information words being written into the input level are transmitted from a data processor, these words may be written into the input level shift registers at high speeds, and at either regular or random intervals. Correspondingly, if the information words read out of the output level of the buffer register are being transmitted to a magnetic tape, these words may be read out at a speed corresponding to the speed of tape travel.

Further it will be appreciated that while the circuit of Figure 1*a* may be used to convert the information word transfer from a serial word input to a parallel word output, if desired this sequence may be reversed in the same circuit, as shown in Figure 1*b*. This circuit comprises the input level 10 and the output level 12 of the same two level buffer register shown in Figure 1*a*. However, the circuit of Figure 1*b* may be operated such that the information words "$W_4$, $W_5$ and $W_6$" are written into input level 10 in a parallel manner with corresponding bits of each information word be applied simultaneously to the input shift register of input level 10. When input level 10 is filled, all of the information words stored therein are transferred simultaneously to output level 12 by the application of a single control pulse. Each word then may be read out of output level 12 in a serial manner, word "$W_4$" first, word "$W_5$" second, etc.

It will be apparent that the combination of Figures 1*a* and 1*b* may be changed so that there can be serial word input and serial word output, and vice versa. In other words, the data may be rearranged by the internal buffer transfer to any desired form.

Figure 2:
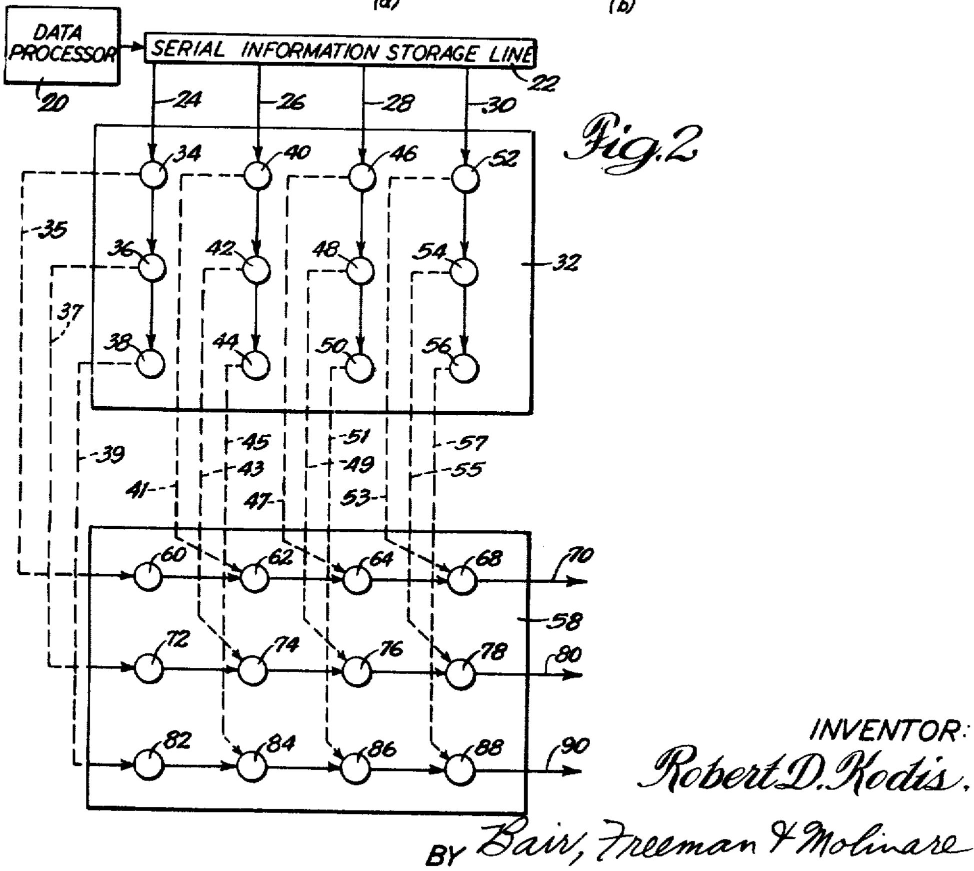
Figure 2 is a diagrammatic illustration of the information flow in a two level buffer register embodying the invention.

Figure 2 illustrates principles of the present invention as embodied in a two level buffer register. Data processor 20 is representative of an electronic computer or any other device adapted for the high speed processing of information data. The output of data processor 20 is connected to a serial information storage line 22 which advantageously may comprise a plurality of delay devices having taps provided at spaced intervals along the storage line. It will be understood by those skilled in the art that serial information storage line 22 may take the form of a plurality of serially connected delay devices such as delay lines, flip flops or gating circuit-delay line stages.

The operation of the embodiment shown in Figure 2 will be illustrated by words comprising four information bits or pulse positions, and therefore four output taps 24, 26, 28 and 30 are provided between the serial information storage line 22 and input level 32 of the buffer register. Input level 32 comprises a bank of four shift registers, each shift register having three bistable storage elements. Thus, the first shift register, connected to output tap 24, comprises bistable storage elements 34, 36 and 38; the second shift register, connected to output tap 26, comprises bistable storage elements 40, 42 and 44; the third shift register, connected to output tap 28, comprises bistable storage elements 46, 48 and 50; and the fourth shift register, connected to output tap 30, comprises bistable storage elements 52, 54 and 56.

The bistable storage elements of each shift register are interconnected such that each bit of information data applied to the first bistable storage element from the serial information storage line 22 is adapted to set the bistable storage element to one stable state to indicate a binary "one" or to its other stable state to indicate a binary "zero." Upon the application of a shift pulse to the shift register the stable condition of each bistable storage element is transferred to the succeeding bistable storage element to thereby shift the bits of information data in sequential steps through the shift registers.

The output level 58 of the buffer register also comprises a plurality of banks of shift registers, each having a number of bistable storage elements. The first shift register comprises bistable storage elements 60, 62, 64 and 68 which are interconnected to enable bits of information data applied to the bistable storage elements to be shifted sequentially through the first shift register onto the buffer register read out conductor 70. The second shift register in output level 58 comprises bistable storage elements 72, 74, 76 and 78 also interconnected to enable the bits of information data applied to the storage elements to be sequentially shifted onto read out conductor 80. The last shift register of output level 58 comprises bistable storage elements 82, 84, 86 and 88 which are interconnected in a similar manner to enable the bits of information data applied to the bistable storage elements to be shifted in a sequential manner onto the read out conductor 90.

In accordance with a feature of this invention each of the bistable storage elements in the input level 32 is connected by a transfer link to a corresponding bistable storage element in the output level 58. Thus, the bistable storage elements in the input level are linked to the bistable storage elements in the output level in the following manner.

Storage element 34 is connected to storage element 60 by transfer link 35; storage element 36 is connected to storage element 72 by transfer link 37; storage element 38 is connected to storage element 82 by transfer link 39; storage element 40 is connected to storage element 62 by transfer link 41; storage element 42 is connected to storage element 74 by transfer link 43; storage element 44 is connected to storage element 84 by transfer link 45; storage element 46 is connected to storage element 64 by transfer link 47; storage element 48 is connected to storage element 76 by transfer link 49; storage element 50 is connected to storage element 86 by transfer link 51; storage element 52 is connected to storage element 68 by transfer link 53; storage element 54 is connected to storage element 78 by transfer link 55; and storage element 56 is connected to storage element 88 by transfer link 57.

The operation of the two level buffer register shown in Figure 2 may be illustrated by assuming that words comprising four information bits or pulse positions are transmitted in a serial fashion from the data processor 20. Since each information word is applied to the serial information storage line 22 serially, the incoming word is stored in its entirety so that it may be written in parallel into the input level 32 of the buffer. This is provided by the storage line 22 which serves as a one word input line adapted to convert a serial input to a parallel output. Thus, when the entire four bit word has gone through storage line 22, the word may be dropped in parallel through the output taps 24, 26, 28 and 30 into the bistable storage elements 34, 40, 46 and 52, respectively, of the first row of input level 32. It will be understood by those skilled in the art that suitable means may be provided to enable the word to be dropped into the first row of input level 32 either in its true or its complemented form. Reference is had to the copending application of Way Dong Woo, Serial No. 601,448, filed August 1, 1956, for a more detailed showing of circuits for controlling such a true or complemented transfer.

After the first information word has been written into the first row of bistable storage elements in input level 32, a second word may be transmitted to the buffer register by means of data processor 20, serial information storage line 22, and output taps 24, 26, 28 and 30. Before the new word is written into the first row, the word previously stored therein is shifted down into the second row of elements 36, 42, 48 and 54, so that the old word now is stored in the second row and the new word is stored in the first row of input level 32. The third word from data processor 20 is written into the first row of input level 32 by shifting the two words stored therein down one row and writing the new word into the first row.

When input level 32 is fully loaded, in this case when three words have been written therein, it is emptied by shifting with one control pulse the information bits stored in each of the bistable storage elements of the input level simultaneously to their corresponding bistable storage elements in output level 58. This places input level 32 in condition to receive new information words from data processor 20. At the same time the information words transferred to output level 58 may be read out of the latter into any desired utilization device such as a three channel magnetic tape. This advantageous result is accomplished by reading out data, one information bit of each of the three words at a time, onto read out conductors 70, 80 and 90 into suitable magnetic recording heads. The information bits in output level 58 are shifted sequentially onto the read out conductors so that the three words are read out of the output level in parallel, with the bits of each word in serial. The shift registers in the buffer levels 32 and 58 may be operated asynchronously if desired by providing separate shifting signal sources for the respective registers.

It has been shown that due to the novel manner of interconnecting the four shift registers of input level 32 to the three shift registers of output level 58, the three information words processed by the buffer register may be written into the register serially, one word at a time, and read out of the register in parallel, three words at a time. It will be understood by those skilled in the art that, if desired, four information words may be written into the input level of the register in parallel and read out of the output level of the register serially. Other combinations will be apparent to those skilled in the art both as to size of the buffer and the interconnections used in the transfer circuits for the rearrangement of the data.

Figures 3, 4:
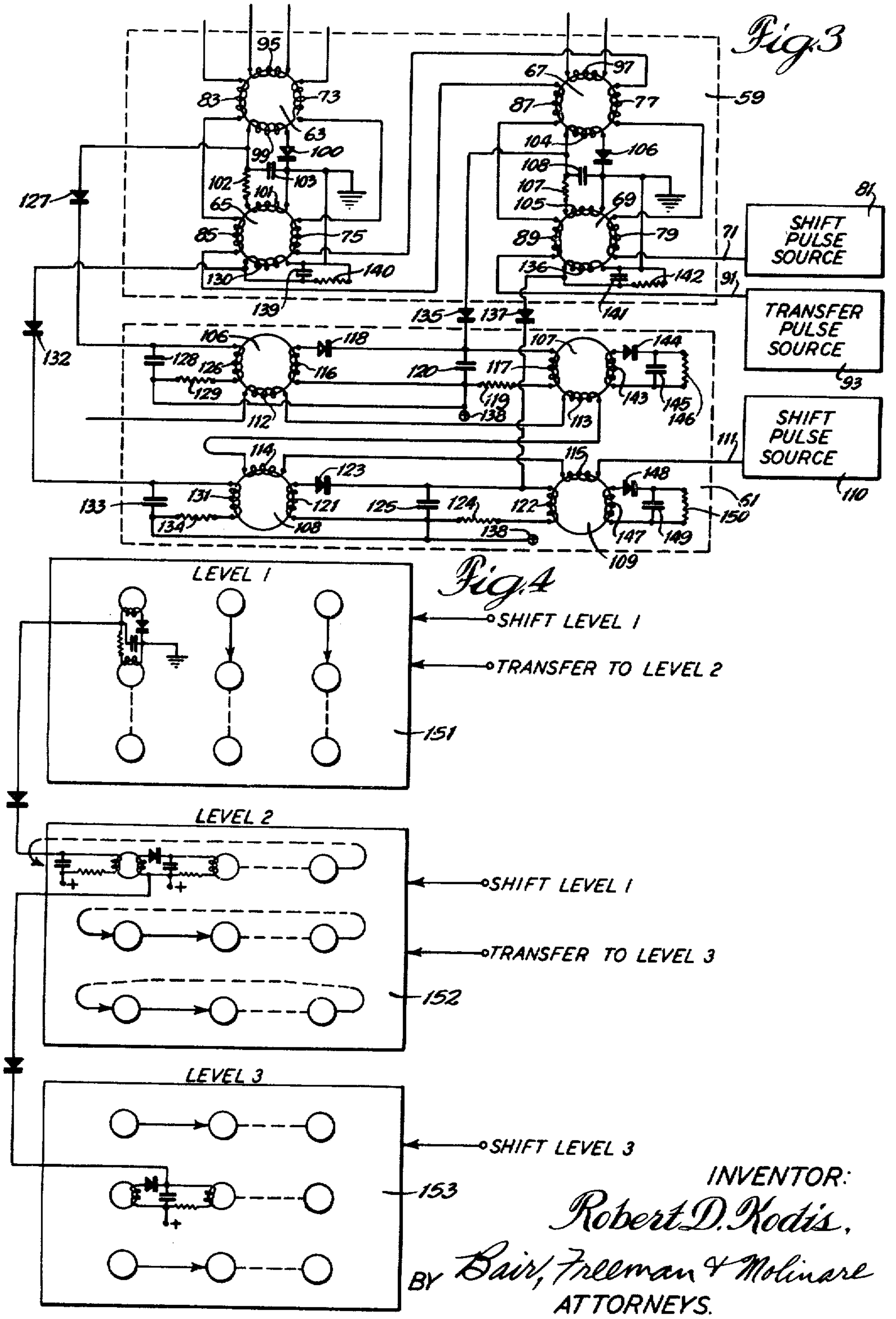
Figure 3 is a schematic diagram of a portion of a two level magnetic core buffer register embodying the invention.
Figure 4 is a diagrammatic showing of a three level magnetic core buffer register embodying the invention.

Figure 3 shows a specific illustrative embodiment of the two level buffer registers described above in which the bistable storage elements are bistable magnetic cores. Advantageously, these magnetic cores are formed of core material having a rectangular hysteresis loop with a large residual flux characteristic. Wound on each of the cores is a trigger or shift winding which, when a pulse is applied thereto, will cause a shifting of the core magnetization from one of its stable states to the other stable state. Thus, if a core has a binary "one" stored therein the application of the shift pulse will switch the core back to the binary zero state and the switching process will induce an output voltage in an output winding wound on the core. Each core also is provided with an input winding which is adapted, when triggered, to place the core in a chosen one of its two stable states of magnetization.

The illustrative schematic diagram of Figure 3 shows an input level 59 of the buffer register which has two two-stage shift registers and an output level 61 of the buffer register which also has two two-stage shift registers. One shift register of input level 59 comprises magnetic cores 63 and 65, and the other shift register comprises magnetic cores 67 and 69. A shift line 71 is coupled to each of cores 63, 65, 67, and 69 through windings 73, 75, 77, and 79, respectively. Each time a shift pulse is applied to shift line 71 from a shift pulse source 81 the cores in a state of magnetization indicative of a binary "one" are switched back to the binary "zero" state with the result that an output voltage is induced in the output windings of the cores.

Each core also is provided with a transfer winding, winding 83 of core 63, winding 85 of core 65, winding 87 of core 67, and winding 89 of core 69, such that when a transfer pulse source 93, the cores having a binary "one" stored therein are switched back to the binary "zero" state to induce an output voltage in the output windings of the cores.

Information bits are written into the two shift registers of the input level 59 by means of input windings 95 and 97 wound on cores 63 and 67, respectively. The output winding 99 of magnetic core 63 is coupled to the input winding 101 of core 65 through a coupling link which includes a diode 100 and a resistor 102, serially connected in the coupling link, and a capacitor 103 connected across the coupling link. The junction of diode 100 and capacitor 103 is connected to ground. The output winding 104 of magnetic core 67 is connected to the input winding 105 of magnetic core 69 by a similar coupling link which comprises diode 106, resistor 107 and capacitor 108.

The buffer register output level 61 includes one shift register comprising magnetic cores 106 and 107 and a second shift register comprising magnetic cores 108 and 109. Each magnetic core in the output level 61 has a shift winding which is connected to a shift pulse source 110 by means of a shift line 111. Thus, shift windings 112, 113, 114, and 115 of cores 106, 107, 108 and 109, respectively, are connected in series in shift line 111 such that each time a shift pulse is applied to shift line 111 from shift pulse source 110 each of the cores storing a binary "one" therein is switched back to its binary "zero" state to induce an output voltage in the output winding of the core.

The output winding 116 of core 106 is connected to input winding 117 of core 107 by means of a coupling link comprising diode 118, resistor 119 and capacitor 120. In a similar manner output winding 121 of core 108 is connected to input winding 122 of core 109 by means of a coupling link which comprises diode 123, resistor 124 and capacitor 125.

In accordance with the invention the output winding 99 on core 63 is connected to the input winding 126 of core 106 through a transfer link including diode 127, capacitor 128 and resistor 129. In a similar manner output winding 130 of core 65 is connected to input winding 131 of core 108 through a transfer link including diode 132, capacitor 133 and resistor 134. Output winding 104 of core 67 is connected to input winding 117 of core 107 through a transfer link including diode 135, capacitor 120 and resistor 119, and output winding 136 of core 69 is connected to input winding 122 of core 109 through a transfer link including diode 137, capacitor 125 and resistor 124. Each of the transfer links is connected to a source of bias potential 138 at the junction of the capacitor and resistor of the input winding circuit.

Output windings 130 and 136 are terminated by capacitor 139 and resistor 140, and capacitor 141 and resistor 142, respectively. It will be appreciated by those skilled in the art that in buffer registers having greater than two-stage shift registers therein the output windings 130 and 136 would be connected to the input windings of the cores of the succeeding stages.

Similarly, output winding 143 of core 107 is terminated in a network comprising diode 144, capacitor 145 and resistor 146, and output winding 147 of core 109 is terminated in a network comprising diode 148, capacitor 149 and resistor 150. Again, it will be understood by those skilled in the art that cores 107 and 109 may be terminated by the record medium apparatus into which the information data is written from the buffer register, or, in buffer registers having greater than two-stage shifting registers in the output level, by the input windings of succeeding cores.

In the operation of the two-level buffer register Figure 3, information is written into input cores 63 and 67 of input level 59 by means of pulses applied to input windings 95 and 97, respectively. When the next group of information bits is received from the data processor, shift pulse source 81 applies a shift pulse by means of the shift line 71 to each of the cores in input level 61 to shift the information bits stored in cores 63 and 67 to cores 65 and 69, thereby clearing cores 63 and 67 for the writing of the new information bits therein.

The shift pulse from the source 81 may be of such polarity as to switch each of the cores 63, 65, 67, and 69 to the "zero" state. Thus, if any one of the cores had a "one" stored therein, the "one" will be read out into the next core in the register and nothing will be read out of those cores having a zero stored therein.

Upon filling of the input level 59 with the two groups of the information bits, a pulse is applied from transfer pulse source 93 to each of the cores in the input level by means of the transfer shift line 91. This transfer pulse clears all of the cores in the input level of the information bits stored therein and causes these information bits to be transferred via the transfer link diodes 127, 132, 135 and 137 to cores 106, 108, 107 and 109, respectively, of the buffer output level 61. Information bits transferred to the output level cores then may be read out of the output level onto a suitable recording medium by means of shift pulses applied to shift line 111 from shift pulse source 110.

The transfer pulse from the source 93 may be of such polarity as to switch each of the cores 63, 65, 67 and 69 into the "one" state. By having the transfer pulse of opposite polarity to that from the shift pulse from source 81, it is possible to isolate the shifts and transfers in the buffer circuits. It should be noted that the transfer between the buffer section 59 and the section 61 will cause the data to be complemented so that all zeroes become ones, and vice versa. As long as the data is recomplemented, when used, as discussed in the aforementioned application of Way Dong Woo, there will be no adverse system effects.

It will be appreciated that while the information bits in the output level 61 are being read out of the latter at a speed matched to the speed of operation of the record medium handling apparatus, additional information bits may be transmitted from the information processor to be stored in the cores of input level 59. Thus information bits may be registered in the input level cores at a speed matched to the speed of operation of a data processor at the same time that information bits in output level 61 are being supplied to the record medium at a speed matched to the speed of operation of the latter.

The two-level buffer register circuits described above can be generalized to three (or more) level buffer registers by providing suitable shift registers, transfer shift windings and transfer link diodes at intermediate levels. A circuit for a three-level buffer register is shown in Figure 4 of the drawing. This circuit comprises an input level 151, an intermediate level 152 and an output level 153. Each of these levels may comprise a plurality of magnetic core shift registers of the type shown in Figure 3 described above. Thus, information bits may be written in successive groups into input level 151 in the manner described heretofore wherein a word is written into the cores by shifting all stored words down one row and writing the new word into the first or input row. When the input level is filled, all of the information bits stored therein may be shifted simultaneously by means of a control pulse on the transfer shift line to corresponding cores in intermediate level 152. Each of the cores in intermediate level 152 is linked by means of a transfer link to a corresponding core in output level 153 so that when it is desired to transfer a new group of information bits from input level 151 to intermediate level 152, the information bits previously stored in intermediate level 152 may be transferred simultaneously to output level 153 for reading out upon a record medium.

In accordance with the invention, the registers in each buffer level can be operated in a closed loop manner by providing a feedback loop from the last core to the first core in each shift register, as shown in intermediate level 152. Thus, the information bits stored therein may be recirculated by means of suitable shift pulses until such time as it is desired to transfer the information bits in intermediate level 152 to the cores of the output level 153. Manifestly, such an arrangement provides a controllable delay in the information transfer operation. Further, if desired, the entire buffer register may be operated in a closed loop manner as may be done in the circuit of Figure 4 by feeding the input level 151 from output level 153 by means of additional transfer shift windings and transfer link diodes.

From the foregoing it will be readily apparent that there has been described a new and improved multi-level buffer register which is relatively simple and yet very flexible in providing an information transfer and storage means. While a preferred embodiment of the invention has been shown, it will be readily apparent to those skilled in the art that changes may be made in the invention without departing from the spirit thereof. Accordingly, it is intended that the invention be limited solely by the scope of the appended claims.

I claim:

1. Information transfer apparatus comprising at least an input level and an output level, each level having a bank of shift registers, a plurality of bistable storage elements in each shift register, means for simultaneously writing a first group of information bits into selected storage elements of the shift registers in said input level, means for shifting said first group of information bits to different storage elements of the shift registers in said input level and for clearing said selected storage elements for simultaneously writing a second group information bits therein, whereby as successive groups of bits are written into said selected storage elements the stored groups of information bits are successively shifted to different storage elements in said input level, a single transfer line coupled to all of the bistable storage elements in said input level, means coupling each bistable storage element in said input level to a corresponding bistable storage element in said output level, and means for applying a control pulse to said transfer line to simultaneously transfer all of the information stored in said input level storage elements to their corresponding storage elements in said output level, whereby said input level is cleared in preparation for storing additional information bits therein.

2. Information transfer apparatus comprising at least an input level and an output level, each level having a bank of shift registers, a plurality of bistable storage elements in each shift register, means for writing a first group of information bits into selected storage elements of the shift registers in said input level, means for shifting said first group of information bits to different storage elements of the shift registers in said input level and for clearing said selected storage elements for writing a second group of information bits therein, whereby as successive groups of bits are written into said selected storage elements the stored groups of information bits are successively shifted to different storage elements in said input level, a transfer line coupled to all of the bistable storage elements in said input level, means coupling each bistable storage element in said input level to a corresponding bistable storage element in said output level, means for applying a control pulse to said transfer line to simultaneously transfer all of the information stored in said input level storage elements to their corresponding storage elements in said output level, whereby said input level is cleared in preparation for storing additional bits therein, and shift means for reading out the information in said output level storage elements at the same time said additional information bits are being written into said input level.

3. Information transfer apparatus comprising at least an input level and an output level, a plurality of bistable magnetic cores in each level, means for writing multi-bit information words into selected magnetic cores of said input level, said words being written into said selected magnetic cores in either a parallel or serial manner, means for successively shifting the information bits from the magnetic cores storing said bits to different magnetic cores each time a new group of bits is written into said selected magnetic cores, a transfer line coupled to all of the magnetic cores in said input level, means coupling each magnetic core in said input level to a corresponding magnetic core in said output level, means for applying a control pulse to said transfer line to simultaneously transfer all of the information bits stored in said input level magnetic cores to their corresponding magnetic cores in said output level, whereby said input level is cleared in preparation for storing additional information words therein, and shift means for reading out the information in said output level magnetic cores, in either a serial or a parallel manner, at the same time said additional information words are being written into said input level.

4. An information transfer register comprising at least first, second and third levels, a bank of multi-bit shift registers in each level, each shift register comprising a plurality of bistable magnetic cores whose bistable state is indicative of the information stored in the element, transfer means coupling the magnetic cores of said first and second levels with corresponding magnetic cores in said second and third levels, respectively, means for sequentially writing information bits into selected magnetic cores in said first level, means for shifting information bits previously written into said first level from each magnetic core storing a bit to a succeeding magnetic core in its shift register each time new information bits are written into said first level, means for transferring all of the information bits stored in said first level to said second level, and means for transferring all of the information bits stored in said second level to said third level.

5. An information transfer register in accordance with claim 4 further comprising shift means for shifting the information bits transferred from the first level to the second level through the magnetic cores of the shift registers in said second level, and feedback means connecting the output of each shift register in the second level to its input to enable the information bits stored in each shift register to be recirculated, as desired, in response to the operation of said shift means.

6. An information transfer register in accordance with claim 5 further comprising shift means for shifting the information bits transferred from said second level to said third level through the magnetic cores of the shift registers in said third level and onto read out conductors for transmittal to suitable utilization devices.

7. An information transfer register in accordance with claim 4 wherein said transfer or information bits from said first to said second level, and from said second to said third level is effected by the application of a single control signal to the transfer conductor in each of said first and second levels.

8. An information transfer register comprising a first plurality of shift registers, a second plurality of shift registers each shift register comprising a plurality of bistable magnetic cores whose bistable states are indicative of the information stored in the cores, means for sequentially writing information bits into each of the shift registers of said first plurality and for sequentially shifting information bits previously written therein through the magnetic cores of each shift register, transfer link means coupling each bistable magnetic core in said first plurality of shift registers to a corresponding bistable magnetic core in said second plurality of shift registers, said transfer link means comprising a single diode connected between each magnetic core in said first plurality of shift registers and its corresponding magnetic core in said second plurality of shift registers, and means for transferring all of the information bits stored in said first plurality of shift registers to said second plurality of shift registers.

9. An information transfer register in accordance with claim 8 wherein the transfer of all of the information bits stored in said first plurality of shift registers to said second plurality of shift registers is effected simultaneously by means of a single transfer signal applied to each of the magnetic cores in said first plurality of shift registers.

References Cited in the file of this patent

UNITED STATES PATENTS

| | | |
|---|---|---|
| 2,702,380 | Brustman | Feb. 15, 1955 |
| 2,844,815 | Winick | July 22, 1958 |

OTHER REFERENCES

Magnetic Elements in Arithmetic and Control Circuits, Electrical Engineering, September 1955, pp. 766–770.

Magnetic Core Circuits for Digital Data Systems, Proceedings of the IRE, February 1956 pp. 154–162.